US009189367B2

(12) United States Patent
Matthiesen et al.

(10) Patent No.: US 9,189,367 B2
(45) Date of Patent: Nov. 17, 2015

(54) METHODS AND SYSTEMS FOR DEBUGGING BYTECODE IN AN ON-DEMAND SERVICE ENVIRONMENT

(75) Inventors: Taggart C Matthiesen, San Francisco, CA (US); Richard Unger, Seattle, WA (US); Peter S. Wisnovsky, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 520 days.

(21) Appl. No.: 12/883,066

(22) Filed: Sep. 15, 2010

(65) Prior Publication Data

US 2011/0258612 A1    Oct. 20, 2011

Related U.S. Application Data

(60) Provisional application No. 61/325,955, filed on Apr. 20, 2010.

(51) Int. Cl.
*G06F 9/44* (2006.01)
*G06F 11/36* (2006.01)

(52) U.S. Cl.
CPC ........ *G06F 11/3664* (2013.01); *G06F 11/3636* (2013.01)

(58) Field of Classification Search
CPC .................. G06F 11/3664; G06F 11/3636
USPC .......................................................... 717/128
See application file for complete search history.

(56) References Cited

U.S. PATENT DOCUMENTS

| 5,442,771 | A | * | 8/1995 | Filepp et al. ................. 709/219 |
| 5,577,188 | A | | 11/1996 | Zhu |
| 5,608,872 | A | | 3/1997 | Schwartz et al. |
| 5,649,104 | A | | 7/1997 | Carleton et al. |
| 5,715,450 | A | | 2/1998 | Ambrose et al. |
| 5,761,419 | A | | 6/1998 | Schwartz et al. |
| 5,796,633 | A | * | 8/1998 | Burgess et al. ............... 702/187 |
| 5,819,038 | A | | 10/1998 | Carleton et al. |
| 5,821,937 | A | | 10/1998 | Tonelli et al. |
| 5,831,610 | A | | 11/1998 | Tonelli et al. |
| 5,873,096 | A | | 2/1999 | Lim et al. |
| 5,918,159 | A | | 6/1999 | Fomukong et al. |
| 5,940,827 | A | * | 8/1999 | Hapner et al. ................. 707/703 |
| 5,963,953 | A | | 10/1999 | Cram et al. |
| 6,092,083 | A | | 7/2000 | Brodersen et al. |
| 6,169,534 | B1 | | 1/2001 | Raffel et al. |
| 6,178,425 | B1 | | 1/2001 | Brodersen et al. |
| 6,189,011 | B1 | | 2/2001 | Lim et al. |
| 6,216,135 | B1 | | 4/2001 | Brodersen et al. |
| 6,233,617 | B1 | | 5/2001 | Rothwein et al. |

(Continued)

*Primary Examiner* — Li B Zhen
*Assistant Examiner* — Sen Chen
(74) *Attorney, Agent, or Firm* — Blakely, Sokoloff, Taylor & Zafman

(57) ABSTRACT

Described herein are means for debugging byte code in an on-demand service environment system including a system for simulating execution debug in a multi-tenant database environment. Such means may include: receiving a request at a web-server of the system, determining one or more trace preferences are active for the request, sending the request to a logging framework communicatively interfaced to the multi-tenant database implementation, processing the request via the logging framework, and capturing at least a portion of the execution data emitted responsive to execution of the plurality of events for use in simulating execution debug of the events. Other related embodiments are additionally described.

20 Claims, 7 Drawing Sheets

(56) References Cited

U.S. PATENT DOCUMENTS

| | | | |
|---|---|---|---|
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 8,266,592 B2 * | 9/2012 | Beto et al. | 717/124 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0114511 A1 * | 5/2005 | Davis et al. | 709/226 |
| 2005/0204356 A1 * | 9/2005 | Sundararajan et al. | 717/176 |
| 2007/0083857 A1 * | 4/2007 | Jiang et al. | 717/130 |
| 2007/0169016 A1 * | 7/2007 | Aakolk et al. | 717/136 |
| 2008/0086479 A1 * | 4/2008 | Fry et al. | 707/10 |
| 2008/0256517 A1 * | 10/2008 | Atkin et al. | 717/124 |
| 2009/0198835 A1 * | 8/2009 | Madhusudanan et al. | 709/248 |
| 2010/0088683 A1 * | 4/2010 | Golender et al. | 717/128 |

* cited by examiner

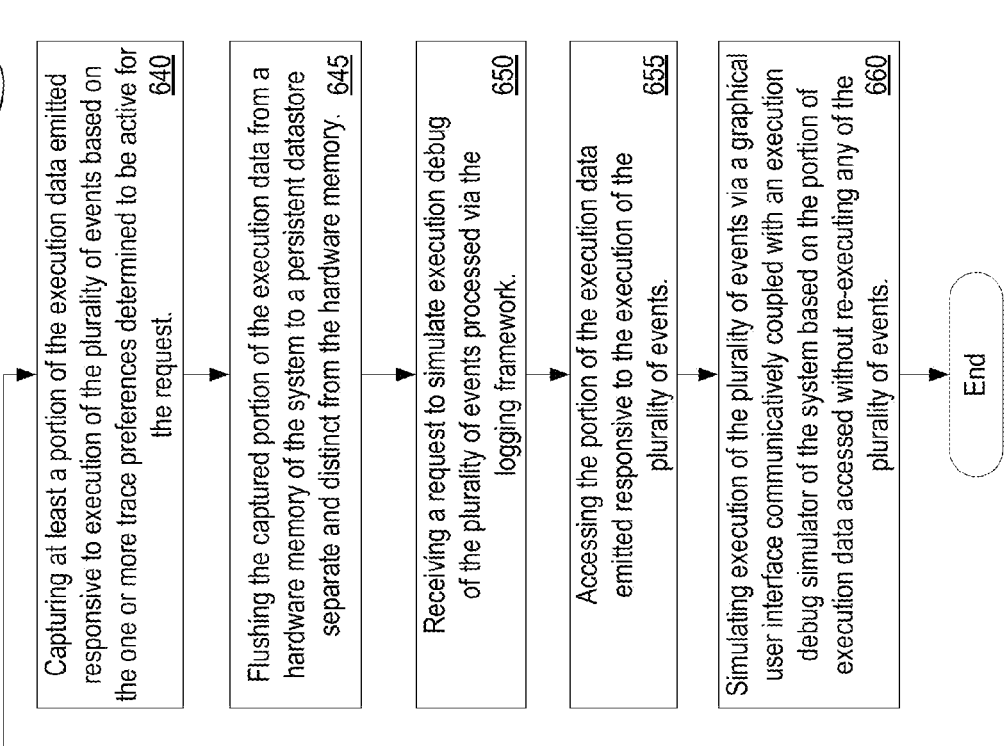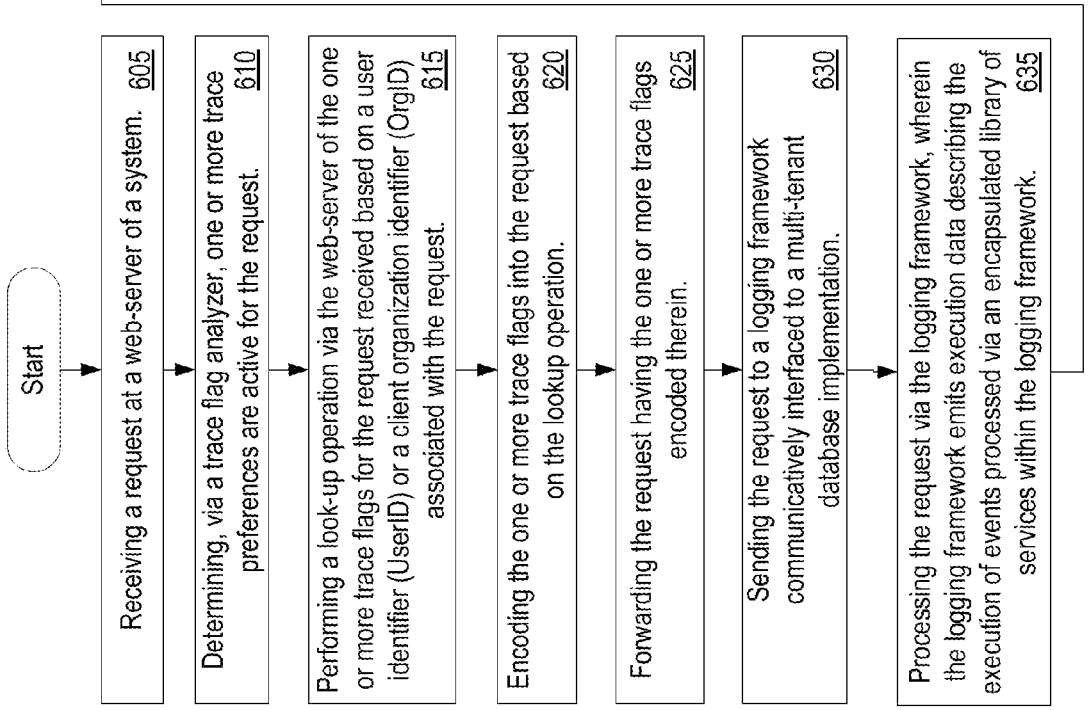
FIG. 6

METHODS AND SYSTEMS FOR DEBUGGING BYTECODE IN AN ON-DEMAND SERVICE ENVIRONMENT

CLAIM OF PRIORITY

This application is related to, and claims priority to, the provisional utility application entitled "Methods and Systems for Debugging Bytecode in an On-Demand Service Environment," filed on Apr. 20, 2010, having an application No. 61/325,955.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to methods and systems for debugging byte code in an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Any programmer or software engineer can readily attest to the need to perform debugging and software quality testing and compliance operations on executable code. For example, the need to perform debugging operations may arise when new functionality is authored, when existing programs are modified to introduce new features or functionality, or when systems and datastores that are referenced by the executable code are modified in some way.

More specifically, syntax errors may be introduced when an executable program is authored, such as a missing semi-colon or a mistyped variable name or type, or logic errors can be similarly introduced, some of which may not be discoverable via automated compiler and syntax checking tools.

In a traditional implementation, executable code is authored by a programmer on behalf of a host organization and then executed within that host organization. In such an environment, the host organization may have a "live" or a "production" environment in which executable code is released and serves to fulfill the business objectives of the organization. In such a traditional implementation, the host organization may also utilize a "test" environment or a "sand-box" environment that closely replicates the production environment, but in which unreleased code can be tested for quality and compliance without negatively impacting actual customers of the host organization that are utilizing the production environment.

Generally, such a structure is a "single-tenant" environment in which a single host organization utilizes underlying hardware and software operating within the host organization to execute the executable code. Because the environment is a single-tenant environment, traditional debugging utilities are sufficient to debug code (e.g. by stepping through the code either line by line, or progressing up to a designated point, at which execution is stopped, allowing the programmer to analyze the detailed program flow, the status of variables, including their contents and input/output (TO) operations to datastores, databases, memory, or to files, and so forth).

Traditional debugging utilities however are insufficient for debugging executable code within a "multi-tenant" environment in which underlying software and hardware elements within a host organization are shared by multiple distinct and, usually, remotely located customer organizations.

For example, traditional debugging utilities require that execution of a tested codebase has to be halted, stopped, or paused at specified points as designated by the programmer for further analysis. Although stopping code execution within a single-tenant environment is acceptable as no other entity is impacted, stopping code execution in a multi-tenant environment is not acceptable as execution would be stopped for all entities on the shared hardware and software resource elements provided by the host organization.

A test-environment that does not allow for concurrent execution of multiple tenants' code bases who are sharing the underlying hardware and software resources could be utilized instead, however, such a test environment would not closely replicate the actual production or live execution environment of a multi-tenant execution environment, and thus, would not provide an adequate test, debug, and quality verification environment, due to the differences between the production execution environment and the modified testing environment.

BRIEF DESCRIPTION OF THE DRAWINGS

Embodiments are illustrated by way of example, and not by way of limitation, and can be more fully understood with reference to the following detailed description when considered in connection with the figures in which:

FIG. 6 is a flow diagram illustrating a method for simulating execution debug in a multi-tenant database environment in accordance with one embodiment.

DETAILED DESCRIPTION

Figure 1:
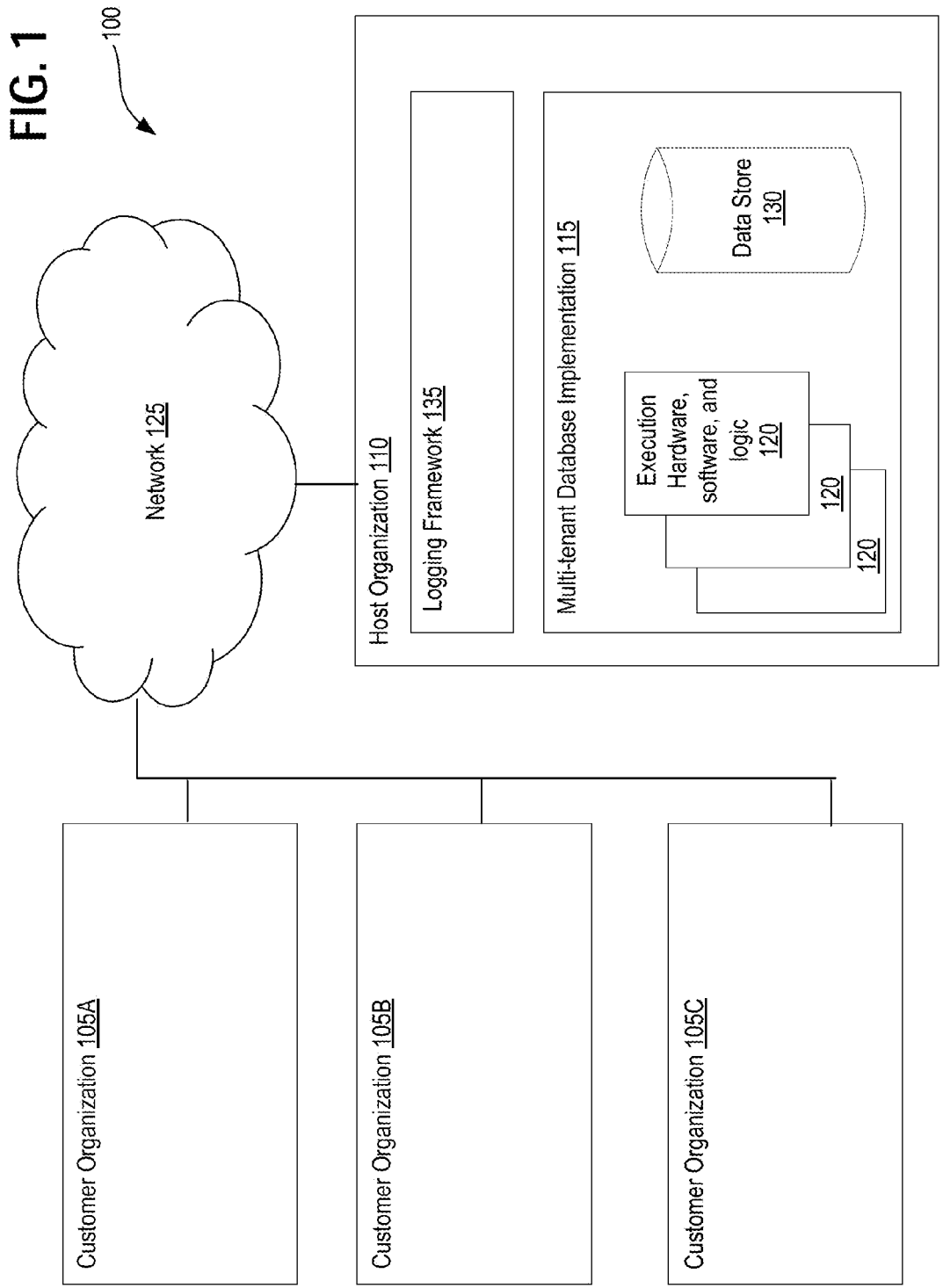
FIG. 1 illustrates an exemplary architecture in which embodiments may operate.

Described herein are systems, devices, and methods for debugging bytecode in an on-demand service environment. In one embodiment, the mechanisms, systems, and methods simulate execution debug in a multi-tenant database environment. For example, in one embodiment, a multi-tenant database implementation 115 executes within a host organization, in which the multi-tenant database implementation 115 includes elements of hardware and software that are shared by a plurality of separate and distinct customer organizations, each of the separate and distinct customer organizations may be remotely located from the host organization having the multi-tenant database implementation 115 executing therein.

In such an embodiment, a logging framework is communicatively interfaced to the multi-tenant database implementation, wherein the logging framework includes an encapsulated library of services for interfacing with the multi-tenant database implementation, and wherein the encapsulated library of services emits execution data describing the execution of events processed via the encapsulated library of services. Further included in this embodiment is a web-server to receive a request, a trace flag analyzer to determine that one or more trace preferences are active for the request, one or more work thread processors to execute a plurality of events against the multi-tenant database implementation, based on the request, via the logging framework, and a listener coupled with the logging framework to capture at least a portion of the execution data emitted responsive to execution of the plurality of events.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a computer readable storage medium having instructions stored thereon, causes one or more processors within a multi-tenant database environment to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Architecture 100 depicts network 125 as connecting the host organization 110 to various customer organizations 105A, 105B, and 105C. Network 125 may include, for example, the Internet, in which each of the customer organizations 105A, 105B, and 105C and the host organization 110 are communicatively interfaced to each other through a series of Local Area Networks (LANs), Wide Area Networks (WANs), or by traversing through various combinations of privately accessible network environments and publicly accessible network environments. Some or all of the network connectivity between the various customer organizations 105A, 105B, and 105C and the host organization 110 may include a Virtual Private Network (VPN) connection, encrypted tunnels, or may include non-private and non-encrypted connectivity.

Importantly, customer organizations 105A, 105B, and 105C access computing resources within the host organization 110 remotely, via network 125. Customer organizations 105A, 105B, and 105C are not co-located with, or part of the host organization 110. Accordingly, from the perspective of each of the customer organizations 105A, 105B, and 105C which are depicted, the computing resources provided by the remote host organization 110 can be described as "cloud computing services," as the services offered by the remote host organization 110 are provided to the respective customer organizations 105A, 105B, and 105C through the network 125, and do not require the customer organizations 105A, 105B, and 105C to host, operate, manage, or install hardware or software to implement the multi-tenant database implementation 115 which is depicted as being provided by the host organization 110.

In one embodiment, host organization 110 provides a system for simulating execution debug in a multi-tenant database environment. In such an embodiment, the host organization 110 provides a multi-tenant database implementation 115 in which underlying hardware and software elements implement database functionality and a code execution environment within the host organization 110 and in which the hardware and software elements of the multi-tenant database implementation 115 are separate and distinct from the plurality of customer organizations (105A-105C). In such an embodiment, each of the separate and distinct customer organizations (105A-105C) may be remotely located from the host organization 110 having the multi-tenant database implementation 115 executing therein.

The hardware and software elements of the multi-tenant database implementation 115 include at least a datastore 130 and execution hardware, software, and logic 120. The datastore may be, for example, persistent data storage for storing information on behalf of a database controlled by the execution hardware, software, and logic 120 of the multi-tenant database implementation 115. For example, in one embodiment, a relational database embodied within the execution hardware, software, and logic 120 stores its underlying records, rows, and data structures upon a Storage Area Network (SAN), upon hard disk drives, and/or upon a Redundant Array of Independent Disks (RAID) arrangement of persistent storage devices within data store 130.

Also depicted within Host organization 110 is a logging framework 135 communicatively interfaced to the multi-tenant database implementation.

Figure 2:
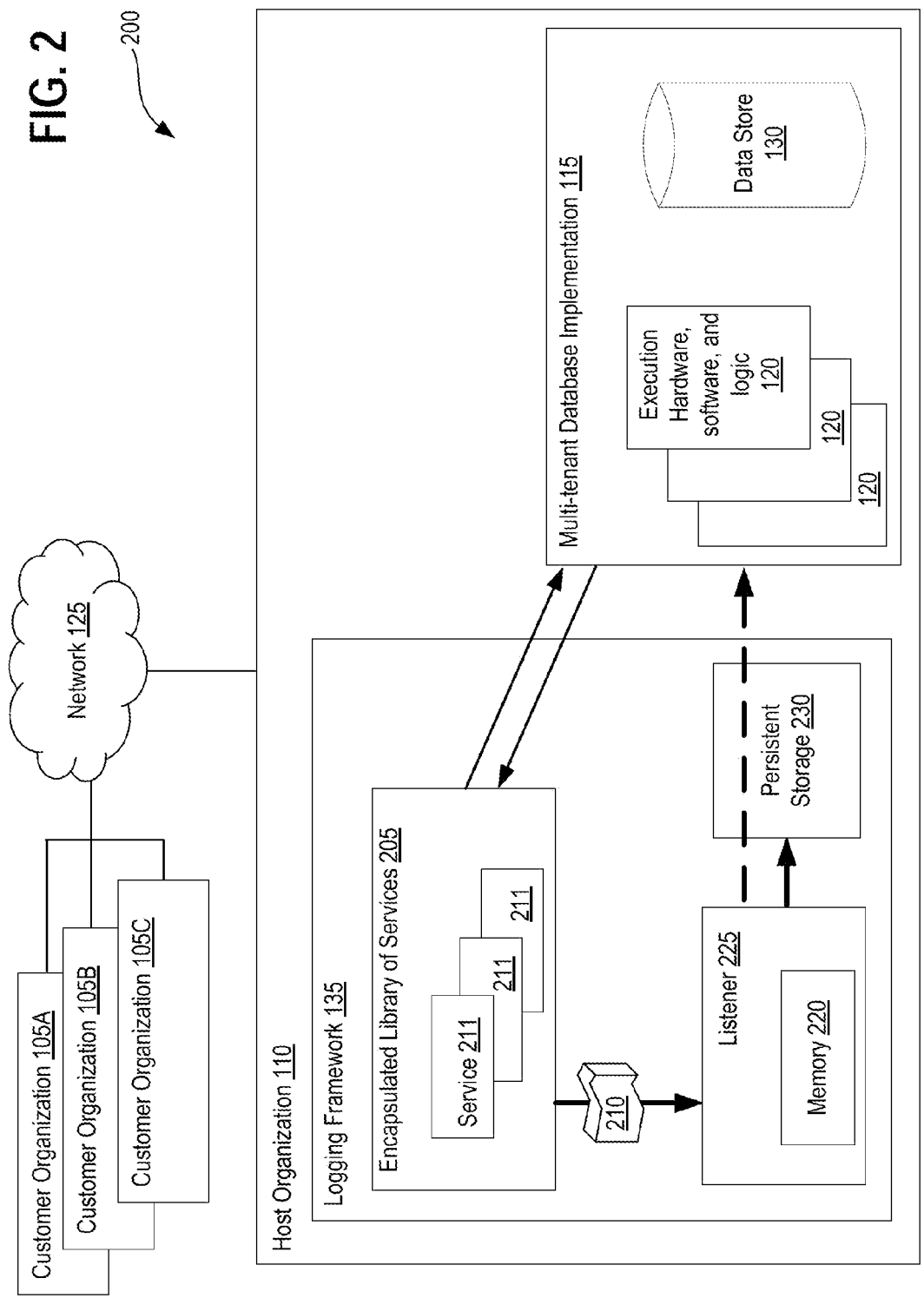
FIG. 2 illustrates an alternative exemplary architecture in which embodiments may operate.

FIG. 2 illustrates an alternative exemplary architecture 200 in which embodiments may operate. In particular, logging framework 135 is depicted in additional detail.

Logging framework 135 includes an encapsulated library of services 205. In one embodiment, the encapsulated library of services 205 provides functionality for interfacing with the multi-tenant database implementation 115 as depicted by the two arrows pointing toward and away from the multi-tenant database implementation 115. In one embodiment, the encapsulated library of services 205 emits execution data 210 describing the execution of events processed via the encapsulated library of services 205, and more specifically, processed via one or more individual services 211 which are embodied within the encapsulated library of services 205.

Each of the services 211 provide various functional capabilities, such as providing functionality for performing an update, a read, a write, a flush, or a commit operation upon database logic within the multi-tenant database implementation 115. Each of the various individual services 211 need not have any awareness or internal acknowledgement that they are embodied within the encapsulated library of services 205, but rather, may function as though they are autonomous library components or individual services 211.

The encapsulated library of services 205 provides functionality for wrapping the individual services 211 with additional logic (e.g., additional executable code or functionality) that causes executable lines of code and operations performed by the individual services to emit execution data 210 for the various operations taken.

For example, in one embodiment, each line of code that is executed within each of the individual services 211 triggers the emission of execution data 210 from the individual service 211 describing one or more of: the line of code that was executed, the result code/error code of the executed line of code, the content of any variable accessed (e.g. instantiated, written to, or read from) by the executed line of code, a customer identifier (UserID) associated with the executed line of code, an Organization identifier (OrgID) associated with the executed line of code, and/or process identifiers/thread identifiers associated with the particular line of code executed.

In certain embodiments, all events (such as every distinctly identifiable line of code that is executed) causes the emissions of execution data 210 from the individual services 211 performing the execution. For example, by forcing all execution to pass through the logging framework 135, and specifically, the encapsulated library of services 205, every single execution event can be forced to emit useful execution data which can then be used to generate a full and complete transcript of execution to be used later for simulating execution debug, which is described in fuller detail below. Forcing the emission of execution data 210 does not require or cause execution to be stopped or halted for any user of the system, which is important for other customer organizations 105A-C making use of the multi-tenant database implementation 115. Obviously, other customer organizations 105A-C are not well served if their own execution is required to be paused, so that another customer organization 105A-C making use of the multi-tenant database implementation 115 can perform debugging operations. Such a working environment would predictably cause day to day operations to quickly deteriorate to a point where none of the customer organizations 105A-C could effectively make use of the shared resources provided by the multi-tenant database implementation 115.

The execution data 210 emitted from each of the individual services 211 is captured and passed on by the encapsulated library of services 205 which embodies each of the various individual services.

In one embodiment, the encapsulated library of services 205 is responsible for processing all interactions requested of the multi-tenant database implementation 115 within the host organization, thus ensuring that all operations executed against or processed by the multi-tenant database implementation 115 pass through the encapsulated library of services 205, regardless of the functionality or operation to be executed, and thus further ensuring that any operation or executable line of code processed against the multi-tenant database implementation 115 triggers and emits execution data 210.

In one embodiment, the execution data 210 emitted by the encapsulated library of services 205 provides a "transcript" of all execution events that occur within the multi-tenant database implementation 115. For example, in one embodiment, the collection of execution events emitted by the encapsulated library of services 205 provides a full and complete view of processing for each individual line of code executed or processed by the multi-tenant database implementation 115.

In one embodiment, the execution data 210 emitted from the encapsulated library of services 205 is captured or buffered by memory 220, such as a high-performance hardware memory having a very high write speed capable of capturing large amounts of incoming data from the logging framework's encapsulated library of services 205. For example, in one embodiment, memory 220 is a hardware implemented memory device having a high-data-rate Random Access Memory (RAM). In one embodiment, the RAM memory is volatile memory, such as a Dynamic RAM (DRAM) module or a Static RAM (SRAM) memory module. In a particular embodiment, memory 220 includes a high-data-rate RAM device that caches at least a portion of the execution data 210 emitted responsive to execution of a plurality of events which are executed against the multi-tenant database implementation 115 via the encapsulated library of services 205. In one embodiment, the execution data 210, or a portion of the execution data 210 emanating from the encapsulated library of services 205 is cached until a flush command is received.

A multi-tenant database implementation 115 such as that which is described herein has the capability of producing and outputting execution data 210 that dwarfs the scale of data producible via a traditional single-tenant database implementation. This is caused by the multiplicative effect of the multiple "tenants" of the database implementation (e.g., the multiple separate and distinct customer organizations 105A, 105B, and 105C as depicted, each of which having their own individual processing needs.

The amount of execution data 210 is further exacerbated by the need to track not only which events are executed, but also by the further need to track "on behalf of whom" the events were executed. Specifically, certain embodiments track each executed line of code according to either an OrgID (e.g. what customer organization the code is being executed for, on behalf of, or at the request of), or a UserID (e.g., what authorized user of the multi-tenant database implementation 115 is the code being executed for, on behalf of, or at the request of). In certain embodiments, a UserID can be correlated with a unique OrgID, for example, if a customer organization has multiple authorized users associated with it, and each UserID associated with the particular customer organization (e.g., 105A-C) is only associated with one particular customer organization 105.

As noted previously, it is not acceptable to stop, halt, or otherwise pause execution within the multi-tenant database implementation 115 on behalf of one particular customer organization 105 so that its code may be debugged, as doing so would cause execution to be halted for all other customer organizations (e.g., 105A-C) contemporaneously executing code against the multi-tenant database implementation 115. Similarly, it is equally undesirable to cause a potential service degradation or a reduction in overall performance speed of the multi-tenant database implementation 115 by requiring the database to emit and persistently store large amounts of execution data 210, a task which could cause unacceptable IO delays in writing extremely large amounts of data to persistent storage (e.g., to hard disk, etc.). Moreover, it may be the case that only data for a particular customer organization 105A-C or a particular UserID is required for debugging purposes, and thus, all other execution data 210 output from the encapsulated library of services 205 can safely be ignored.

Therefore, in accordance with one embodiment, execution data 210 emitted from the encapsulated library of services 205 is streamed to a listener 225 coupled with the logging framework 135 to capture at least a portion of the execution data 210 emitted responsive to execution of the plurality of events. In one embodiment, the high-speed memory device (e.g., memory 220) which provides temporary caching/buffering of the emitted execution data 210 is part of the listener 225. In an alternative embodiment, memory 220 is separate from, but coupled with listener 225.

In one embodiment, listener 225 functions to monitor all execution data 210 emitted or streamed from the encapsulated library of services 205 for particular signatures upon which the listener 225 can screen data. For example, those signatures may include a specified OrgID, a specified UserID, execution against a particular table or data structure within the multi-tenant database implementation 115, or against a particular process-identifier (such as a master process ID or a parent process ID associated with a block of execution).

Because streaming or caching data to a high-speed/high-data rate hardware memory device such as volatile RAM does not incur as substantial of IO costs for the execution platform as streaming or caching to a persistent storage device, such as a hard disk drive, the execution data 210 can be temporarily captured during the actual execution phase of the plurality of events to be executed without causing an unacceptable performance degradation of the execution platform, compared to, for example, attempting to write all of the execution data 210 to much slower non-volatile persistent storage as it is emitted from the encapsulated library of services 205.

In one embodiment, none of the execution data 210 cached by memory 220 is written to persistent (e.g., non-volatile storage) until control is returned from the multi-tenant database implementation 115 back to, for example, an end-user client machine that requested or triggered the execution of the plurality of events against the multi-tenant database implementation 115. For example, once the multi-tenant database implementation 115 completes execution of the requested events, or services, or functionality (such as a series of operations involving the execution hardware, software, and logic 120 and the data store 130 of the multi-tenant database implementation 115) control is returned to an end-user or an end-user client machine within, for example, one of the customer organizations 105A-C.

In one embodiment, once control is returned from the multi-tenant database implementation 115, the logging framework 135 triggers a flush command of the execution data 210 cached by memory 220.

For example, in one embodiment, a portion of the execution data 210 is flushed from the high-data-rate RAM (e.g., memory 220) to a non-volatile storage device 230. In such an embodiment, execution data 210 is transient while in memory 220 and persistent when placed into persistent storage 230. In one embodiment, the non-volatile storage device 230 is persistent storage on a hard-disk drive within the host organization 110 having space allocated to a customer organization associated with the request (e.g., a service request) that triggered the execution of the plurality of events. In another embodiment, the persistent storage is located within the multi-tenant database implementation 115 in an area allocated to a customer organization associated with the request. For example, a flush command initiated by the logging framework 135 may cause a portion or a subset of the cached execution data 210 available in memory 220 to be flushed to persistent storage 230 within the logging framework 135. In an alternative embodiment, a flush command initiated by the logging framework 135 may cause a portion or a subset of the cached execution data 210 available in memory 220 to be flushed directly to the multi-tenant database implementation 115 for persistent storing, for example, via data store 130, bypassing persistent storage 230 which is local to the logging framework 135. In one embodiment, listener 225 initially captures, moves, or flushes a portion of transiently stored execution data 210 from memory 220 into persistent storage 230 where the portion of execution data 210 is then stored in a persistent manner and subsequently migrates or moves the portion of execution data 210 from persistent storage 230 to alternative persistent storage, such as data store 130. In such an embodiment, because control is already returned to the requesting end-user or end-user client machine prior to executing a flush from memory 220 to persistent storage 230 and/or data store 130, the flush operation would appear to occur "behind the scenes" to the user, and would thus not be perceived as a performance slow down owing to the delay in writing the transiently cached execution data 210 in memory 220 to persistent storage device 230 or alternative persistent storage such as data store 130. Similarly, because execution is complete, there is no need to pause, slow, or halt execution of the code for the requesting customer organization 105A-C or for other customer organizations 105A-C which are contemporaneously executing code via the shared resources within the host organization 110.

In a particular embodiment, the execution data 210 persistently stored (e.g., upon persistent storage 230 or data store 130) is subsequently transmitted to an end-user client machine having originated the request responsive to a retrieval request. For example, the end-user client machine having originated the request may subsequently request retrieval of the portion of execution data 210 pertinent to the execution request, such as data associated with a specified OrgID and/or UserID, at which point the portion of execution data 210 requested by the end-user client is responsively transmitted to the end-user client's machine located within a customer organization 105A-C via network 125, thus allowing the end-user client's machine to store the portion of the execution data 210 locally within the customer organization 105A-C. For example, the end-user client's machine may store the retrieved portion of execution data on a hard disk or other non-volatile storage device local to the end-user client's machine. In such an embodiment, the end-user client machine is remote and distinct from the system of the host organization that implements the described logging framework 135 and multi-tenant database implementation 115.

Figure 3:
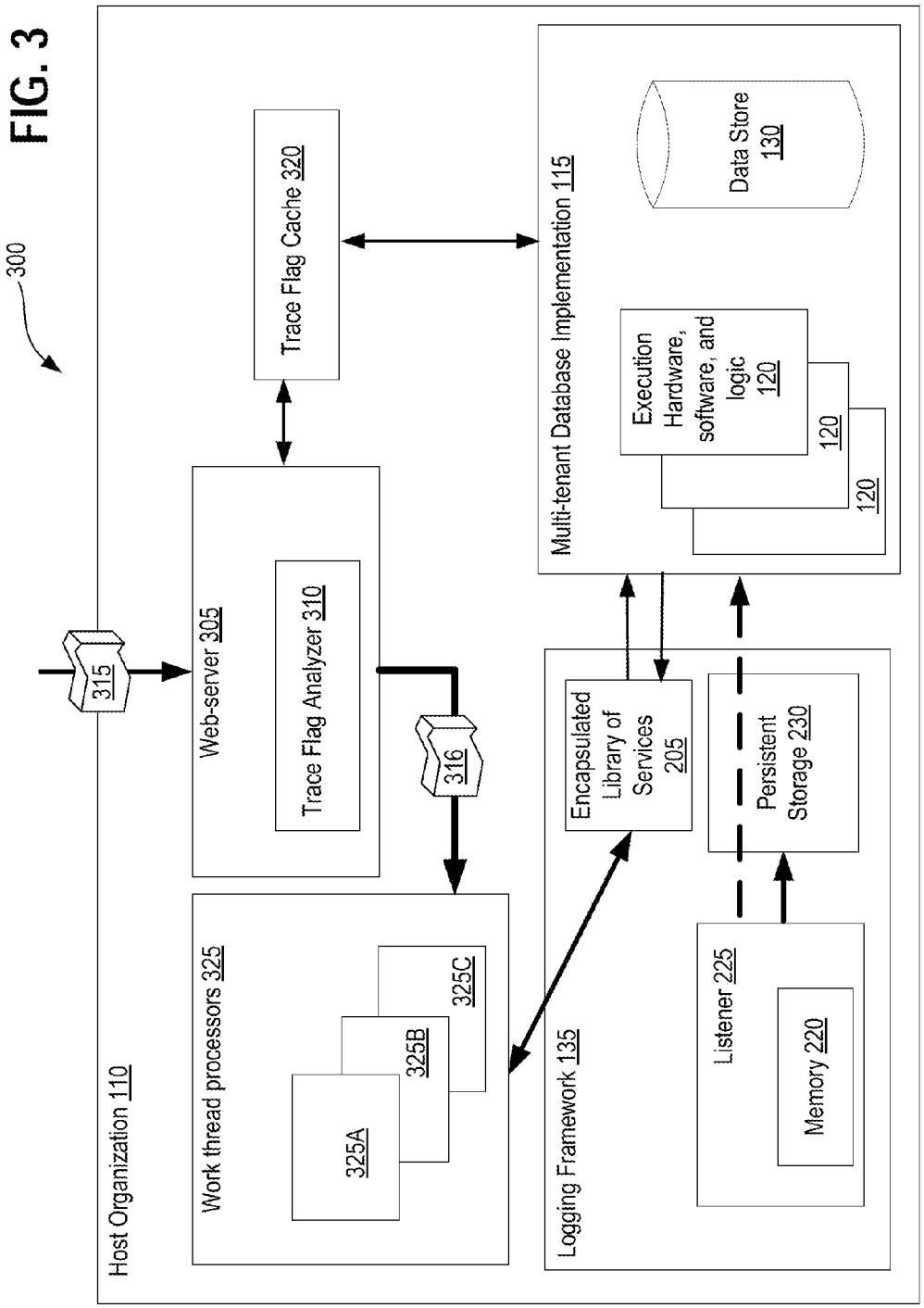
FIG. 3 illustrates an alternative exemplary architecture in which embodiments may operate.

FIG. 3 illustrates an alternative exemplary architecture 300 in which embodiments may operate. Depicted within architecture 300 is a web-server 305 and a trace flag analyzer 310.

In a particular embodiment, host organization 110 receives a request 315, for example, from a customer organization 105A-C described previously. In such an embodiment, the request 315 is received at the host organization 110 via web-server 305. In one embodiment, web server 305 provides a web-based interface to a end-user client machine originating the request (e.g., such as an end-user client device located within a customer organization 105A-C). The request 315 constitutes a request for services from the multi-tenant database implementation 115 operating within the host organization 110.

In one embodiment, the web-server 305 contains a trace flag analyzer 310 having functionality to determine whether one or more trace preferences are active for the request. For example, in a particular embodiment, trace preferences are transmitted within the request 315 itself, and the trace flag analyzer 310 extracts the preferences from the request 315 to determine which, if any, trace flags are active for the particular request 315 for services. In an alternative embodiment, trace flags are not encoded within the request 315 for services, and thus, the trace flag analyzer 310 determines which, if any, trace flags are active for the request 315 by fetching the trace flags from the multi-tenant database implementation 115 or from a trace flag cache 320 which is configured to store or cache trace flag preferences to be corresponded or associated with incoming requests 315 from customer organizations 105A-C.

In a particular embodiment, trace flag analyzer 310 determines that one or more trace preferences are active based on a UserID associated with an incoming request 315. In an alternative embodiment, trace flag analyzer 310 determines that one or more trace preferences are active based on an organization identifier OrgID associated with the request 315. In yet another embodiment, trace flag analyzer 310 determines that one or more trace preferences are active based on a consideration of both the UserID and additionally the OrgID associated with an incoming request 315. In one embodiment, the trace flag analyzer 310 determining that one or more trace preferences are active includes the trace flag analyzer 310 performing one or more of the following operations: (1) comparing a UserID embodied or encoded within the request 315 against a plurality of trace flags cached in a memory of the system, such as within trace flag cache 320; (2) reading the one or more trace preferences for a UserID, OrgID, or both, as embodied or encoded within the request 315, from the multi-tenant database implementation 115 based on the corresponding UserID, OrgID, or both; (3) reading the one or more trace preferences directly from the request 315 received, for example, where the trace flag preferences are encoded directly into the request 315 by the originating end-user machine or the originating client origination 105A-C; or (4) having the trace flag analyzer 310 correspond the UserID to an OrgID associated with the request 315 and determining the one or more trace preferences specified for the OrgID.

In one embodiment, trace flag cache 320 includes a memory cache which is communicatively interfaced to the multi-tenant database. In one embodiment, the trace flag cache 320 caches a plurality of trace flags persistently stored by the multi-tenant database, wherein each trace flag is associated with either a UserID, an OrgID, or both. In one embodiment, each trace flag cached within trace flag cache 320 indicates a trace preference is active for the associated UserID, and/or OrgID.

Referring back to web-server 305 of FIG. 3, in one embodiment, web-server 305 receives the request 315 for services from an end-user client machine (e.g., such as a client device located at one of customer organizations 105A-C) and then web-server 305 encodes one or more trace flags into the request 315 based on the one or more trace preferences corresponding to a user identifier UserID or an OrgID associated with the request. In one embodiment, web-server 305 then forwards the request 315 having the one or more trace flags encoded therein to one or more work thread processors 325 to process the request 315. For example, request 316 having the one or more trace flags encoded therein is depicted as being forwarded by web-server 305 to one or more of the work thread processors (e.g., 325A, 325B, and 325C) for processing. In such an embodiment, the one or more trace flag preferences do not arrive encoded within request 315, but rather, are looked up and associated by web-server 305, encoded within a modified request 316 having the one or more trace flag preferences injected into the request, and then forwarded for processing, by the work thread processors 325 which in turn may engage logging framework 135 as described above.

Regardless of the manner in which the trace flags are determined to be active for a particular request, the trace flags are eventually relied upon by listener 225 to determine what portion, if any, of execution data 210 emitted from the encapsulated library of services 205 is to be captured and persistently stored for later use. As noted above, in certain embodiments, all executable events cause the emission of execution data 210 and this occurs without regard to any particular trace flag being active or inactive. However, in such an embodiment, listener 225 can screen or sift through the execution data 210 cached into memory 220 and flush or persistently store only those events determined to be of interest based upon the trace flags which are active.

One benefit of managing trace flags in such a manner is that non-administrative users can activate debugging options within a system architecture that traditionally does not allow end-users or customer organizations 105A-C to have any control over debugging preferences. For example, using traditional database implementations, debugging operations must be activated or launched by a system administrator or a database administrator, or via a user account having such permissions. However, by encapsulating all executable events within the encapsulated library of services 205, execution data 210 is forced to be emitted, and the listener 225 is then enabled to screen and capture the desirable portions of that execution data 210 based on trace flags which can be activated by end-users, customer organizations 105A-C, system administrators, or any entity having permissions to cause a trace flag to be active, without regard to whether that entity has administrative privileges within, for example, the multi-tenant database implementation 115.

In one embodiment, once execution for a particular request 315 is complete, all execution data 210 emitted responsive to that particular request 315 is either purged or overwritten in the memory 220 by subsequent caching of execution data 210. Accordingly, in such an embodiment, only execution data 210 specified by the listener 225 to be flushed to persistent storage device 230 is permanently maintained.

Figure 4:
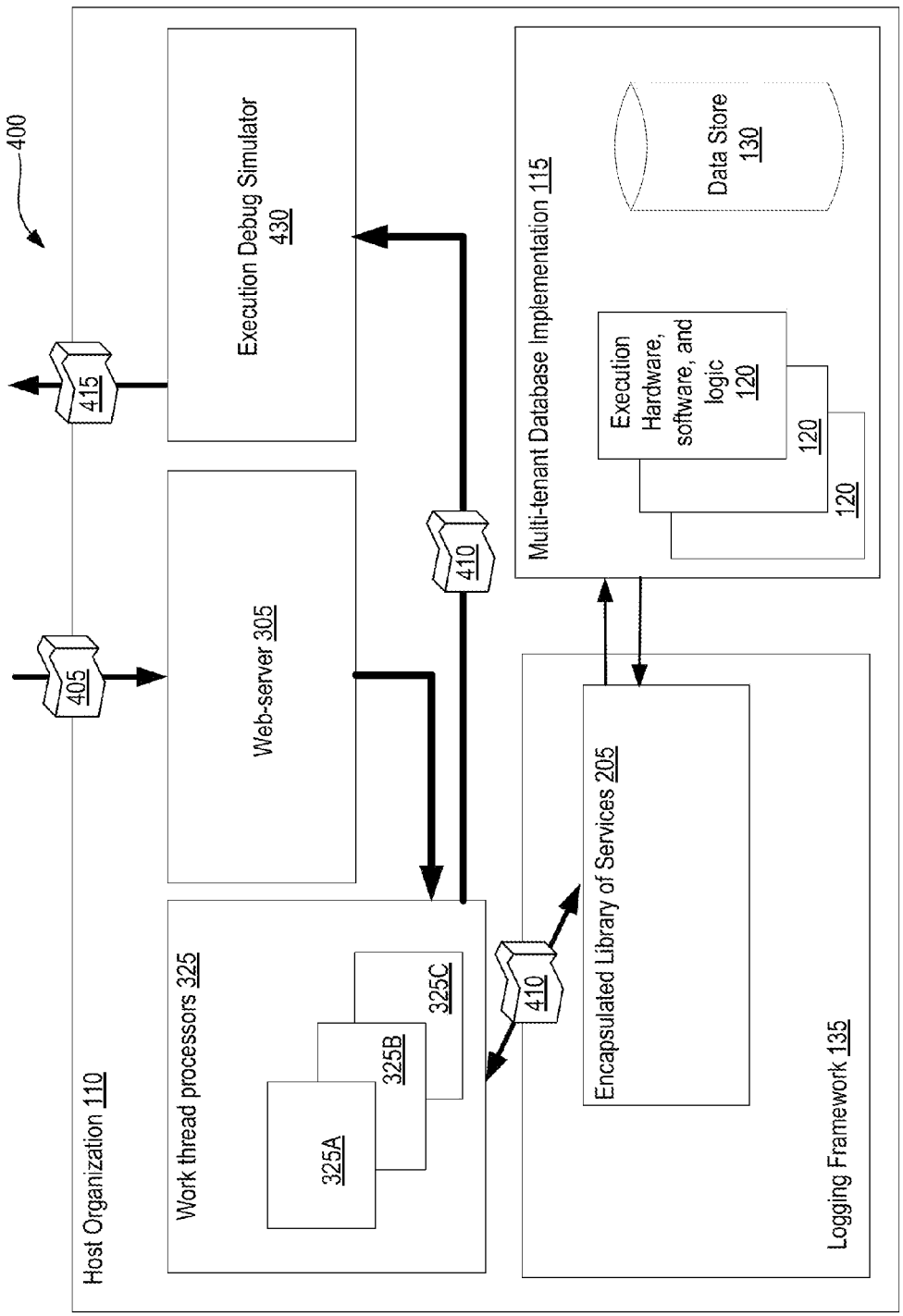
FIG. 4 illustrates an alternative exemplary architecture in which embodiments may operate.

FIG. 4 illustrates an alternative exemplary architecture 400 in which embodiments may operate. In one embodiment, host organization 110 includes an execution debug simulator 430 communicatively interfaced with web-server 305 and work thread processors 325A, 325B, and 325C.

In one embodiment, execution debug simulator 430 accesses the portion of the execution data 210 emitted responsive to the execution of the plurality of events. For example, in one embodiment, a request 405 received at web-server 305 requests an execution debug simulation to be run via host organization 110. In a particular embodiment, web-server 305 forwards the request for execution simulation 405 to work thread processors 325 for processing, which in turn retrieve a transcript of execution events 410 corresponding to a prior request for services (e.g., such as a transcript of execution events 410 corresponding to the processing of request 315 described above which would have been emitted within execution data 210 corresponding to the request). In a particular embodiment, work thread processors 325 then forward the transcript of execution events 410 to execution debug simulator 430 which then sends a response 415 to the requestor, the response 415 containing information necessary to simulate execution debug of the prior request (e.g., request 315).

In one embodiment, execution debug simulator 430 simulates execution of the plurality of events via a graphical user interface communicatively coupled with the execution debug simulator 430, wherein simulating execution of the plurality of events includes at least presenting output corresponding to execution of one or more of the plurality of events based on the portion of execution data 210 emitted and retrieved within the transcript of execution events 410. In such an embodiment, the portion of execution data 210 emitted and retrieved as the transcript of execution events 410 is accessed and retrieved without re-executing any of the plurality of events for the original request (e.g., request 315 described previously).

In one embodiment, the original request 315 triggers one or more trace debug preferences to be active and thus triggers at least a portion of the execution data 210 emitted to be persistently stored and the subsequent request 405 requesting execution debug simulation does not trigger any trace flag preferences to be active, and thus, any execution data 210 emitted in fulfillment of request 405 is not stored persistently.

In one embodiment, execution debug is described as a "simulation" or provided via a "simulator" because standard execution debug operations (e.g., pausing, stopping, or halting operation, analyzing variable inputs/outputs, analyzing command return codes, formed SQL queries, data sets returned subject to SQL queries, etc.) are not performed during execution of the actual request (e.g., 315) causing the execution data 210 to be generated and emitted, but rather, because the transcript of execution events 410 is later retrieved/accessed after the original request (315) has been completed. For example, execution debug simulator 430 can "re-play" or "simulate" the original execution by referencing the persistently stored execution data 210 emitted without requiring that any portion of the original request 315 be re-executed or reprocessed.

In such a fashion, other tenants or customer organizations 105A-C which rely upon uninterrupted execution and processing of work via the host organization's resources, including the multi-tenant database implementation 115, can have their respective requests processed efficiently without interruption by the need to perform execution debug on behalf of one of the plurality of customer organizations' 105A-C execution requests.

Figure 5:
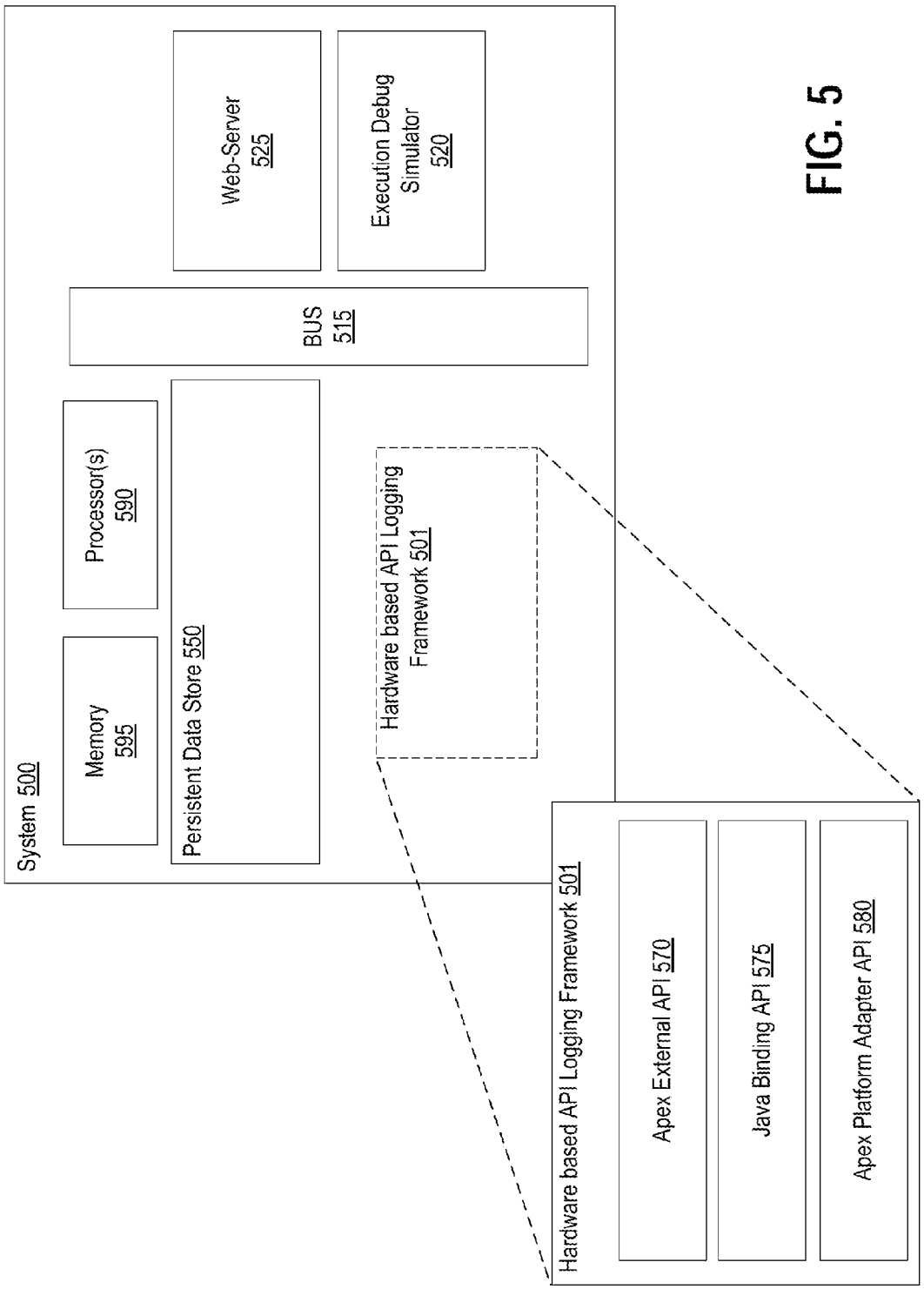
FIG. 5 shows a diagrammatic representation of a system in which an embodiments of the invention may operate, be installed, integrated, or configured.

FIG. 5 shows a diagrammatic representation of a system 500 in which an embodiments of the invention may operate, be installed, integrated, or configured.

In one embodiment, system 500 includes a memory 595 and a processor or processors 590. For example, memory 595 may store instructions to be executed and processor(s) 590 may execute such instructions. System 500 includes bus 515 to transfer transactions and data within system 500 among a plurality of peripheral devices communicably interfaced with bus 515. System 500 further includes a persistent data store 550 (e.g., a memory, hard drive, multi-tenant database implementation, or a communications path to such a persistent data store or storage location). System 500 further includes webserver 525, for example, to receive requests, return responses, and otherwise interface with remote clients, such as client devices located within customer organizations 105A-C. System 500 is further depicted as having an execution debug simulator 520 therein which has implementing logic to, for example, retrieve execution debug transcripts and provide an execution debug environment, interface, GUI, or services to requesting clients.

Distinct within system 500 is a hardware based API logging framework 501 which includes Apex External API 570, Java Binding API 575, and an Apex Platform Adapter API 580, having implementing logic thereon. For example, in one embodiment, hardware based API logging framework 501 includes Apex External API 570 that is an outward facing API designed to be consumed (e.g., referenced or accessed) by remote customer organizations (e.g., 105A-C of a host Enterprise Organization (e.g., 110), in which the Apex External API 570 specifies how users within the remote customer organizations soliciting resources from system 500 may access a reference to an Apex type (class or interface), create an instance of the type, and execute methods on the instance, for example, methods or requests that are to be processed via processor(s) 590 and or the work thread processors 325 described previously.

Java™ Binding API 575 or a Java™ compatible Binding API 575 depicted within the hardware based API logging framework 501 extends Apex with capabilities defined by a Java™ compatible programming environment, wherein the Java™ Binding API allows new types to be added to Apex backed by corresponding Java™ types within the Java™ compatible programming environment, and wherein Java™ compatible methods of the Java™ compatible programming environment are enabled to be invoked from within Apex via a type mapping between Apex and the Java™ compatible programming environment. In such an embodiment, the new "types" to be added to Apex and backed by corresponding Java™ types are not specified or natively supported by standard Java™ implementations, but rather, provide and enable new functionality within the described Apex structure as supported by the hardware based API logging framework 501.

An Apex Platform Adapter API 580 within the hardware based API logging framework 501 improves layering between Apex interfacing components of the system 500. For example, the Apex Platform Adapter API 580 accesses Apex from lower layers of an associated Apex platform environment by clearly defining the implementing communication and transaction details expected from an associated Apex platform environment.

In one embodiment, each of the Apex External API 570, the Java Binding API 575, and the Apex Platform Adapter API 580 further include a plurality of unit tests, wherein each of the unit tests include functionality to test a plurality of layers of the associated Apex platform environment independently. For example, each of the unit tests may be configured to test functionality of one or more interfaces of the hardware based API logging framework 501 without engaging or requiring execution of underlying business logic behind the one or more interfaces, thus permitting debug and diagnostic activities in a manner that is isolated from the underlying business logic distinct from functionality of the one or more interfaces. such as that which is described above in accordance with various embodiments of the invention. Stated differently, the isolated "debug and diagnostic activities" to be performed without "engaging or requiring execution of the underlying business logic" provides a simulator for the execution debug (e.g., via execution debug simulator 520) without interrupting other transactions and data services conducted via system 500.

In one embodiment, the hardware based API logging framework 501 encapsulates all executable events processed within system 500 thus causing execution data to be emitted by the execution of such events. This execution data may then be utilized by execution debug simulator 520 to provide debug and diagnostic activities without the need to engage or re-execute underlying business logic.

FIG. 6 is a flow diagram illustrating a method 600 for simulating execution debug in a multi-tenant database environment in accordance with one embodiment. Method 600 may be performed by processing logic that may include hardware (e.g., circuitry, dedicated logic, programmable logic, microcode, etc.), software (e.g., instructions run on a processing device to perform operations such as data capture and debug simulation), or a combination thereof. In one embodiment, method 600 is performed by hardware logic, such as the hardware based API logging framework depicted at element 501 FIG. 5 and/or the execution debug simulator 520 as depicted in FIG. 5. Some of the blocks and/or operations listed below are optional in accordance with certain embodiments. The numbering of the blocks presented is for the sake of clarity and is not intended to prescribe an order of operations in which the various blocks must occur.

Method 600 begins with processing logic receiving a request at a web-server of a system (block 605). At block 610, processing logic determines one or more trace preferences are active for the request. Such a determination may be performed by a trace flag analyzer.

At block 615, processing logic performs a look-up operation (e.g., via the web-server) of the one or more trace flags for the request received based on a user identifier (UserID) or a client organization identifier (OrgID) associated with the request. At block 620, processing logic encodes the one or more trace flags into the request based on the lookup operation, and at block 625, processing logic forwards the request having the one or more trace flags encoded therein.

At block 630, processing logic causes the request to be sent a logging framework communicatively interfaced to a multi-tenant database implementation. At block 635, the request is processed via the logging framework, wherein the logging framework emits execution data describing the execution of events processed via an encapsulated library of services within the logging framework. Such processing may be conducted in conjunction with one or more work thread processors having memory and hardware processing units (e.g., CPU(s)) to implement the processing logic and perform the requested operations.

At block 640, processing logic captures at least a portion of the execution data emitted responsive to execution of the plurality of events based on the one or more trace preferences determined to be active for the request.

At block 645, processing logic flushes the captured portion of the execution data from a hardware memory of the system to a persistent data store separate and distinct from the hardware memory. In one embodiment, the emitted execution data is captured first via a high-data rate memory, such as a volatile but high-speed RAM device, and then responsive to receiving a flush command, the emitted execution data is flushed to a persistent storage device for later retrieval.

At block 650, processing logic receives a request to simulate execution debug of the plurality of events processed via the logging framework. At block 655, processing logic accesses the portion of the execution data emitted responsive to the execution of the plurality of events (e.g., from persistent storage, such as on a hard disk drive or from within the multi-tenant database implementation). At block 660, processing logic simulates execution of the plurality of events via a graphical user interface communicatively coupled with an execution debug simulator of the system based on the portion of execution data accessed without re-executing any of the plurality of events. For example, data describing the execution of events, such as a transcript of execution events performed, may be relied upon to replay or simulate the actual execution on behalf of an execution debug simulator.

Figure 7:
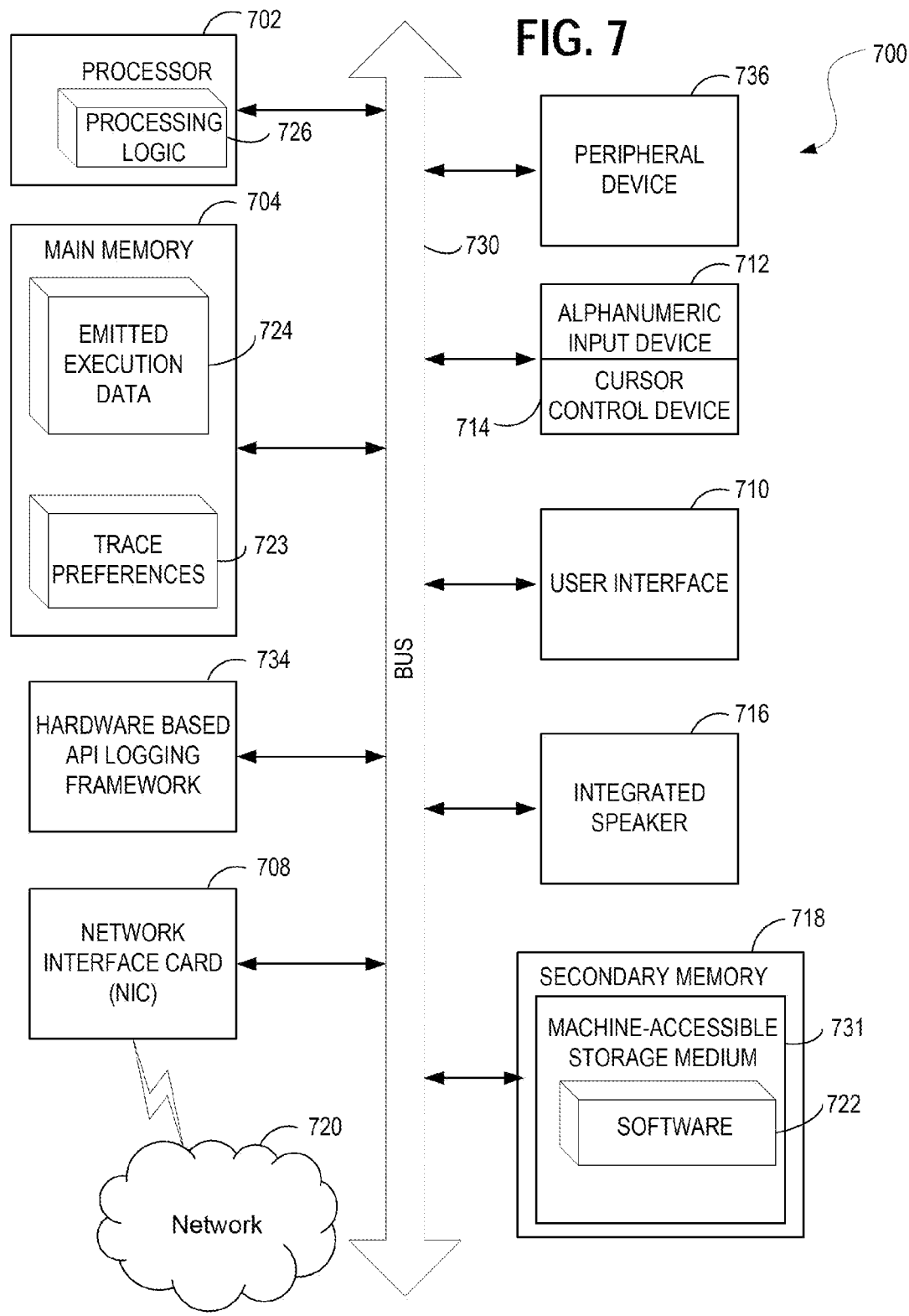
FIG. 7 illustrates a diagrammatic representation of a machine in the exemplary form of a computer system, in accordance with one embodiment.

FIG. 7 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and persistent multi-tenant database implementations), which communicate with each other via a bus 730. Main memory 704 includes emitted execution data 724 (e.g., data emitted by a logging framework) and one or more trace preferences 723 which operate in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc. The computer system 700 may further include a Hardware based API logging framework 734 capable of executing incoming requests for services and emitting execution data responsive to the fulfillment of such incoming requests.

The secondary memory 718 may include a non-transitory machine-readable storage medium (or more specifically a machine-accessible storage medium) 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the invention is therefore determined in reference to the appended claims, along with the full scope of equivalents to which such claims are entitled.

What is claimed is:

1. A method in a host organization having at least a processor and a memory therein, wherein the method comprises:
    receiving a request at a web-server of the host organization, the request specifying one or more services to access a multi-tenant database of the host organization, the multi-tenant database operating within a production environment;
    determining, via a trace flag analyzer, one or more trace preferences for the request, wherein the trace flag analyzer determines the one or more trace preferences are active for the request based on a client organization identifier (OrgID) associated with the request;
    sending the request to a logging framework communicatively interfaced to the multi-tenant database, wherein the logging framework comprises an encapsulated library of services to access the multi-tenant database, the encapsulated library of services including the one or more services;
    servicing the request via the logging framework while the multi-tenant database concurrently services requests each from a different respective one of a plurality of distinct customer organizations, wherein servicing of the request results in each individual service of the one or more services emitting respective execution data describing execution of each event by the individual service to service the request, wherein the servicing of the request generates the execution data without causing execution of the encapsulated library of services to be stopped or halted for any of the plurality of distinct customer organizations; and
    tracing an execution of code by the one or more services to service the request, including tracing according to the OrgID associated with the request, the OrgID corresponding to one of the plurality of distinct customer organizations, wherein tracing the execution of code includes a listener receiving the execution data emitted by the one or more services and selectively sending only a portion of the execution data to a persistent storage based on the one or more trace preferences, wherein, after servicing of the request is completed, an execution debug simulation is performed with the portion of execution data sent to the persistent storage.

2. The method of claim 1, wherein servicing the request via the logging framework comprises servicing the request via one or more work thread processors, wherein the one or more work thread processors execute a plurality of events against the multi-tenant database, based on the request, via the logging framework.

3. The method of claim 1, further comprising:
    receiving a request to simulate execution debug of a plurality of events processed via the logging framework to service the request.

4. The method of claim 3, further comprising:
    simulating the execution of the plurality of events in response to the request by:
    accessing the portion of the execution data emitted by the one or more services responsive to the execution of the plurality of events; and
    simulating execution of the plurality of events via a graphical user interface communicatively coupled with an execution debug simulator of the system, wherein simulating execution of the plurality of events comprises at least presenting output corresponding to execution of one or more of the plurality of events based on the portion of execution data accessed without re-executing any of the plurality of events.

5. The method of claim 1, wherein selectively sending only the portion of the execution data to the persistent storage comprises flushing the portion of the execution data from a high-data-rate RAM to a non-volatile storage device, wherein the non-volatile storage device is selected from the group comprising:
    persistent storage on a hard-disk drive within the host organization having space allocated to a customer organization associated with the request;
    persistent storage within the multi-tenant database in an area allocated to a customer organization associated with the request; and
    persistent storage on a non-volatile storage device communicatively interfaced with an end-user client machine having originated the request, wherein the end-user client machine is remote and distinct from the system of the host organization.

6. The method of claim 1:
    wherein the OrgID corresponds to one of the plurality of distinct customer organizations remote from the host organization without regard to the end-user originating the request.

7. The method of claim 1, further comprising:
    performing a look-up operation via the web-server of the one or more trace flags for the request received based on the OrgID associated with the request;
    encoding, via the web-server, the one or more trace flags into the request based on the lookup operation; and
    forwarding the request having the one or more trace flags encoded therein to one or more work thread processors to process the request in coordination with the logging framework.

8. A non-transitory computer readable storage medium having instructions stored thereon that, when executed by a processor of a host organization, the instructions cause the host organization to perform operations comprising:

receiving a request at a web-server of the host organization, the request specifying one or more services to access a multi-tenant database of the host organization, the multi-tenant database operating within a production environment;

determining, via a trace flag analyzer, one or more trace preferences for the request, wherein the trace flag analyzer determines the one or more trace preferences are active for the request based on a client organization identifier (OrgID) associated with the request;

sending the request to a logging framework communicatively interfaced to the multi-tenant database, wherein the logging framework comprises an encapsulated library of services to access the multi-tenant database, the encapsulated library of services including the one or more services;

servicing the request via the logging framework while the multi-tenant database concurrently services requests each from a different respective one of a plurality of distinct customer organizations, wherein servicing of the request results in each individual service of the one or more services emitting respective execution data describing execution of each event by the individual service to service the request, wherein the servicing of the request generates the execution data without causing execution of the encapsulated library of services to be stopped or halted for any of the plurality of distinct customer organizations; and tracing an execution of code by the one or more services to service the request, including tracing according to the OrgID associated with the request, the OrgID corresponding to one of the plurality of distinct customer organizations, wherein tracing the execution of code includes a listener receiving the execution data emitted by the one or more services and selectively sending only a portion of the execution data to a persistent storage based on the one or more trace preferences, wherein, after servicing of the request is completed, an execution debug simulation is performed with the portion of execution data sent to the persistent storage.

9. The non-transitory computer readable storage medium of claim 8, wherein the method further comprises receiving a request to simulate execution debug of a plurality of events processed via the logging framework to service the request.

10. The non-transitory computer readable storage medium of claim 9 wherein simulating the execution of the plurality in response to the request comprises:

accessing the portion of the execution data emitted by the one or more services responsive to the execution of the plurality of events; and simulating execution of the plurality of events via a graphical user interface communicatively coupled with an execution debug simulator of the system, wherein simulating execution of the plurality of events comprises at least presenting output corresponding to execution of one or more of the plurality of events based on the portion of execution data accessed without re-executing any of the plurality of events.

11. The non-transitory computer readable storage medium of claim 8, wherein selectively sending only the portion of the execution data to the persistent storage comprises flushing the captured portion of the execution data from a high-data-rate Random Access Memory (RAM) of the system to a separate and distinct non-volatile storage device, wherein the non-volatile storage device is selected from the group comprising:

persistent storage on a hard-disk drive within the host organization having space allocated to a customer organization associated with the request;

persistent storage within the multi-tenant database in an area allocated to a customer organization associated with the request; and persistent storage on a non-volatile storage device communicatively interfaced with an end-user client machine having originated the request, wherein the end-user client machine is remote and distinct from the system of the host organization.

12. The method of claim 1, further comprising tracking each executed line of code associated with servicing the request according to a customer identifier (UserID) in addition to OrgID, the UserID identifying which authorized user of the multi-tenant database the request is being executed for, on behalf of, or at the request of said UserID which corresponds to an end-user originating the request from within one of the plurality of distinct customer organizations remote from the host organization.

13. The method of claim 1, wherein the execution data describes one or more of:

a line of code that was executed servicing the request, a result code/error code of the executed line of code, contents of any variable accessed, instantiated, written to, or read from by the executed line of code, a customer identifier (UserID) associated with the executed line of code, the OrgID associated with the executed line of code, and process identifiers/thread identifiers associated with the line of code executed.

14. A system comprising:

a processor;

a memory;

a web-server to receive a request specifying one or more services to access a multi-tenant database operating within a production environment and servicing a plurality of distinct customer organizations' service requests concurrently;

a trace flag analyzer to determine one or more trace preferences for the request, wherein the trace flag analyzer determines the one or more trace preferences are active for the request based on a client organization identifier (OrgID) associated with the request;

a logging framework comprising an encapsulated library of services communicatively interfaced to the multi-tenant database to process the request, the encapsulated library of services including the one or more services to service the request while the multi-tenant database concurrently services requests each from a different respective one of a plurality of distinct customer organizations, wherein the one or more services to service the request results in each individual service of the one or more services emitting respective execution data describing execution of each event by the individual service to service the request, wherein the servicing of the request generates the execution data without causing execution of the encapsulated library of services to be stopped or halted for any of the plurality of distinct customer organizations; and a listener interfaced to the logging framework to trace an execution of code by the one or more services to service the request, including the listener to trace according to the OrgID associated with the request, the OrgID corresponding to one of the plurality of distinct customer organizations, wherein the listener to trace the execution of code includes the listener to receive the execution data emitted by the one or more services and to selectively send only a portion of the execution data to a persistent storage based on the one or more trace preferences, wherein, after the request is serviced, an execution debug simulation is performed with the portion of execution data sent to the persistent storage.

15. The system of claim 14, further comprising:

an execution debug simulator to:

access the portion of the execution data emitted by the one or more services responsive to the execution of a plurality of events to service the request; and simulate execution of the plurality of events via a graphical user interface communicatively interfaced with the execution debug simulator, wherein simulating execution of the plurality of events comprises at least presenting output corresponding to execution of one or more of the plurality of events based on the portion of execution data accessed and without re-executing any of the plurality of events.

16. The system of claim 14:

wherein the listener to selectively send only the portion of the execution data to the persistent storage comprises the listener to flush the portion of the execution data from a a high-data-rate Random Access Memory (RAM) to a non-volatile storage device and wherein the high-data-rate RAM caches the portion of the execution data emitted by the one or more services responsive to execution of a plurality of events until a flush command is received; and wherein the non-volatile storage device is selected from the group comprising:

persistent storage on a hard-disk drive within the host organization having space allocated to a customer organization associated with the request, persistent storage within the multi-tenant database implementation in an area allocated to a customer organization associated with the request, and persistent storage on a non-volatile storage device communicatively interfaced with an end-user client machine having originated the request, wherein the end-user client machine is remote and distinct from the system of the host organization.

17. The system of claim 14, wherein the trace flag analyzer to determine one or more trace preferences comprises the trace flag analyzer to determine one or more trace preferences are active based on a user identifier (UserID) or the OrgID associated with the request.

18. The system of claim 17, wherein the trace flag analyzer to determine the one or more trace preferences are active based on a UserID or the OrgID associated with the request comprises the trace flag analyzer to perform one of the following operations:

compare the UserID embodied within the request against a plurality of trace flags cached in a memory of the system;

read the one or more trace preferences for the UserID embodied within the request from the multi-tenant database based on the UserID;

read the one or more trace preferences from the request received; or correspond the UserID to the OrgID associated with the request and implement the one or more trace preferences specified for the OrgID.

19. The system of claim 14, wherein the web server provides a web-based interface to a remotely located end-user client machine originating the request, wherein the request comprises a request for services from the multi-tenant database implementation operating within the host organization.

20. The system of claim 19, further comprising:

a webserver, wherein the web server:

receives a request for services from the remotely located end-user client machine;

encodes one or more trace flags into the request based on the one or more trace preferences corresponding to a user identifier (UserID) or the OrgID associated with the request; and forwards the request having the one or more trace flags encoded therein to the one or more work thread processors to process the request.

* * * * *